(12) United States Patent
Jin

(10) Patent No.: US 6,237,216 B1
(45) Date of Patent: May 29, 2001

(54) APPARATUS FOR AUTOMATICALLY DISMANTLING A WINDSHIELD GLASS AND A REAR GLASS FROM A DISUSED AUTOMOBILE

(75) Inventor: Cheol Min Jin, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/436,251

(22) Filed: Nov. 9, 1999

(30) Foreign Application Priority Data

Jun. 3, 1999 (KR) ................................. 99-20370

(51) Int. Cl.⁷ ..................................................... B23P 19/00
(52) U.S. Cl. ........................ 29/800; 29/426.4; 29/403.1; 29/403.3; 29/700; 29/822; 414/744.2; 414/752.1
(58) Field of Search ..................... 29/800, 426.4, 29/403.1, 403.3, 701, 703, 709, 700, 822; 414/744.2, 752.1

(56) References Cited

U.S. PATENT DOCUMENTS 3,448,517 * 6/1969 Cothery .
4,199,852 * 4/1980 Ayers et al. ............................ 29/239
4,453,303 * 6/1984 Leddet .................................. 29/407
4,669,168 * 6/1987 TAmura et al. ....................... 29/429
4,670,974 * 6/1987 Antoszewski et al. ................ 29/701
4,885,833 * 12/1989 Umegai et al. ....................... 29/407
5,234,325 * 8/1993 Hill ...................................... 425/12
5,622,093 * 4/1997 Hutchins ................................ 83/13

* cited by examiner

Primary Examiner—S. Thomas Hughes
Assistant Examiner—John C. Hong
(74) Attorney, Agent, or Firm—Birch, Stewart, Kolasch & Birch, LLP

(57) ABSTRACT

A system for recycling the components dismantled from a disused automobile, which includes a main body having a control part, front and rear glass removers connected with the main body for dismantling the glass from the body of the disused automobile, two molding removal systems connected to the glass remover for removing the molding which connects the glass to the body of the automobile, and a moving apparatus for removing the molding which connects the glass to the body of the automobile, and a moving apparatus for moving the main body in all directions and controlling the position of the main body to the automobile. The windshield glass and the rear glass are automatically dismantled from the disused automobile before compression of the body of the automobile.

5 Claims, 5 Drawing Sheets

APPARATUS FOR AUTOMATICALLY DISMANTLING A WINDSHIELD GLASS AND A REAR GLASS FROM A DISUSED AUTOMOBILE

BACKGROUND OF THE INVENTION

Field of the Invention

The present invention relates to a system for recycling the components dismantled from a disused automobile and more particularly, an apparatus for automatically dismantling windshield glass (front glass) and rear glass from a disused automobile, which can save cost and labor.

Generally, the body of a disused automobile is melted in a furnace and recycled as reclaimed material. According to a traditional method of dismantling a disused car, metal parts, resin parts like an bump and a instrument panel and tires of the automobile are dismantled from the automobile before the body of the disused car is pressed and inserted into the furnace.

Since the glass provided with the automobile is not removed, when pressing the body to decrease the size of the automobile, the glass present in to the automobile is pressed together with the body of the automobile. Therefore the glass is broken and remains in the pressed body of the automobile. Thus, when the metal body of the automobile is melted in the furnace, the glass and the metal body are melted together. The metal combined with the glass cannot be recycled. As the result, the efficiency for recycling the metal from the body of the disused automobile is reduced.

Furthermore, since the glass is not reclaimed from the disused automobile, this resource is wasted and the discarded glass introduces an impurity into the environment.

For the above reasons, it is necessary for the glass to be reclaimed from the disused automobile before it is inserted into the furnace. However, when the disuse automobile is dismantled, the glass cannot be separated from the vehicle because of the cost and time required for dismantling the glass from the disused automobile.

The method of dismantling and separating glass from a disused automobile is presently conducted by hand, which is time consuming and impractical.

SUMMARY OF THE INVENTION

The object of the present invention is to provide an apparatus for automatically and simultaneously dismantling windshield glass and rear glass from a disused automobile before compressing it to compact the size of the body of the disused automobile. This system provides a considerable cost savings.

The device of the present invention comprises a main body having a control part, two glass removers connected with the main body for dismantling the glass from the body of the disused automobile, two molding removers provided on the glass remover for removing the molding which connects the glass to the body of the automobile, and a movable for moving the main body in all directions and controlling the position of the main body to the automobile.

The glass remover comprises an are pivotally connected to the main body through a hinge pin, a cylinder connecting the arm with the main body for moving the arm up and dow, and a suction device mounted at the end of the arm for adhering to the glass by vacuum force, and for simultaneously removing the windshield glass and the rear glass from the vehicle.

The molding removal system comprises a rail which is connected with the sucking supporter and arranged to match with the mold of the windshield glass and the rear glass respectively, two transporters which move along the rail; a molding heater mounted on the transporter for heating the molding mounted between the glass and the body of the automobile at the edge of the glass, a molding remover mounted at the rear end of the molding heater for removing the heated molding, and an air ventilator for sucking the polluted air generated when the molding is heated by the molding heater.

BRIEF DESCRIPTION OF THE DRAWINGS

The above object and other advantages of the present invention will become more apparent by describing in detail the preferred embodiment of the present invention with reference to the attached drawings in which:

FIG. 3 is an enlarged schematic diagram of the molding removal system;

FIG. 4 shows the working process in which the apparatus in accordance with the present invention is operated.

DETAILED DESCRIPTION OF THE INVENTION

Figure 1:
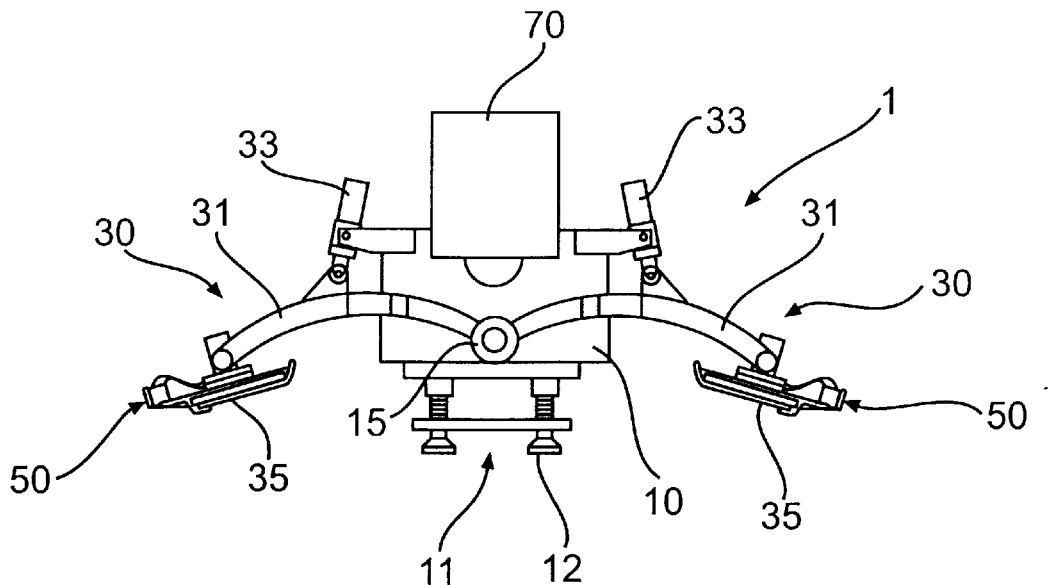
FIG. 1 is a front view of the apparatus in accordance with the present invention.
Figure 2:
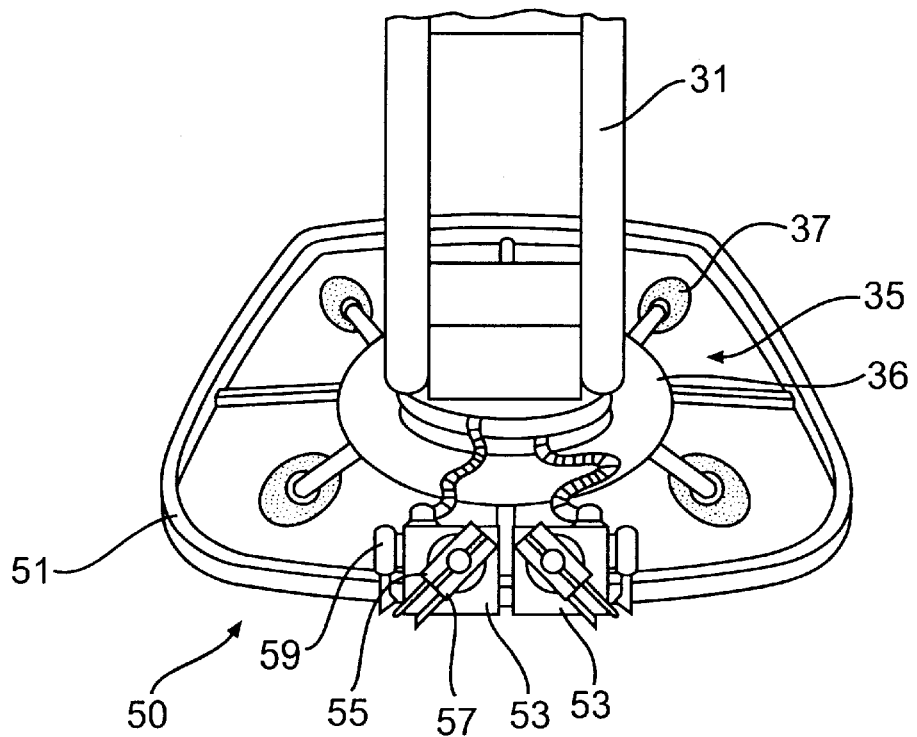
FIG. 2 is a perspective view of a glass removal system and a molding remover in accordance with the present invention.

FIG. 1 and FIG. 4 shows an embodiment of the glass-dismantling device in accordance with the present invention. The glass-dismantling device 1 comprises a main body 10 having a control part, two glass removers 30 connected with the main body 10, two molding removal systems 50 disposed on the glass remover 30 and, a movable means 70.

An attaching means 11 is provided under the main body 10 which comprises at least several pneumatic sucking discs 12.

The glass remover 30 comprises an arm 31 pivotally connected to the main body 10 through a hinge pin 15. A cylinder 33 is also connected to arm 31 and the main body 10 for moving the arm 31 up and down. A sucker 35 is mounted at the end of the arm 31 for sucking attachment to the glass, and simultaneous removal of the windshield glass 103 and the rear glass 104.

The arm 31 is shaped in an arc that does not contact with the glass and thus can safely dismantle the glass from the automobile. The sucker 35 comprises a sucking supporter 36 mounted at the end of the arm 31, to opposite the windshield glass 103 and the rear glass 104 and four pneumatic sucking pads 37 are provided for directly contacting the windshield glass 103 and rear glass 104.

The molding removal systems 50 comprises a rail 51 which is connected with the sucking supporter 36 and arranged to match with the mold of the windshield glass 103 and the rear glass 104 respectively, two transporters 53 moving along the rail 51, a molding heater 55 mounted on the transporter 53 for heating the molding mounted between the glass and the body of the automobile at the edge of the glass, a molding remover 57 mounted at the rear end of the molding heater 55 for removing the heated molding 105, and an air ventilator 59 for sucking the polluted air generated when the molding is heated by the molding heater 55, and which is mounted on the sucking supporter 36 of the sucker 35 for removing the molding 105 between the body of the automobile and the glass 103, 104.

The two transporters 53 move at a speed of about 500 mm/min in opposite directions along the rail and is arranged to match with the edge of the glass 103, 104. The molding heater 55, the molding remover 57 and the air ventilator 59 are mounted on the transporter 53 and move along the rail 51 together.

The molding heater 55 is a torch type that discharges a flame having a temperature of about 210° C. The molding 105 becomes soft due to the flame of the heater which facilitates the easy removal of the glass 103, 104 from the vehicle.

The air ventilator 59 has an air sucker 60 that is provided above the molding heater 55 for drawing out the polluted air generated when the molding is heated by the molding heater, and an exhaust pipe 61 is provided for exhausting the polluted gas to the atmosphere after purifying the gas.

The movable means 70 conveys the main body 10 in all directions in order to control its position for mounting the main body 10 on the roof panel 102 of the disused automobile. The movable means also controls the position of the sucker 35 on the glass 103, 104 of the automobile. The vertical moving speed of the movable means 70 is 500 mm/min when approaching the body of the automobile, and the horizontal moving speed of the movable means 70 is 300 mm/min for controlling the position of the molding remover 57.

With the embodiment in accordance with the present invention, a hood panel, a wiper assembly, and a cowl top cover etc must be removed, before the windshield glass and the rear glass are dismantled.

Then the body of the automobile is transported to the working space and the dismantling work is started.

Figure 4A:
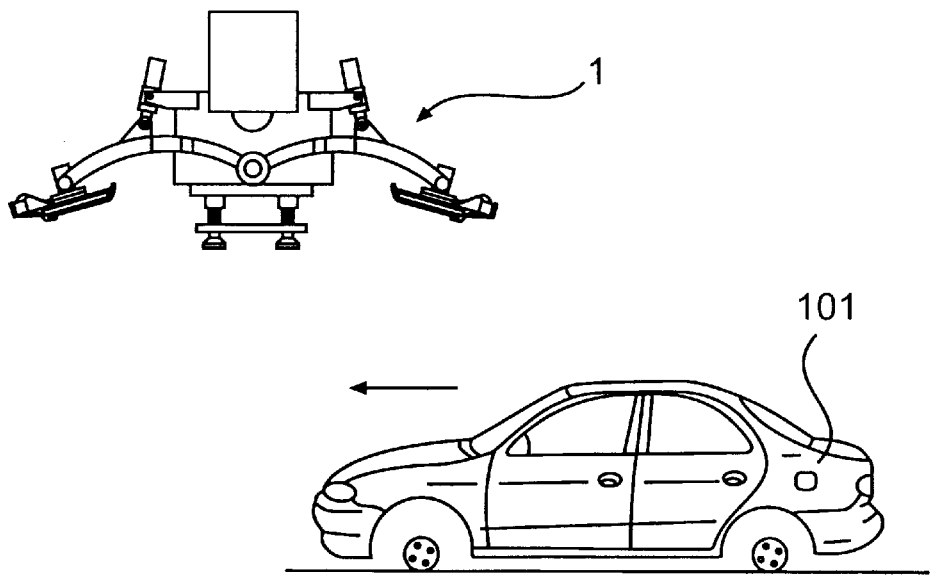
FIG. 4a shows the state where the disused automobile is positioned on the working area.
Figure 4B:
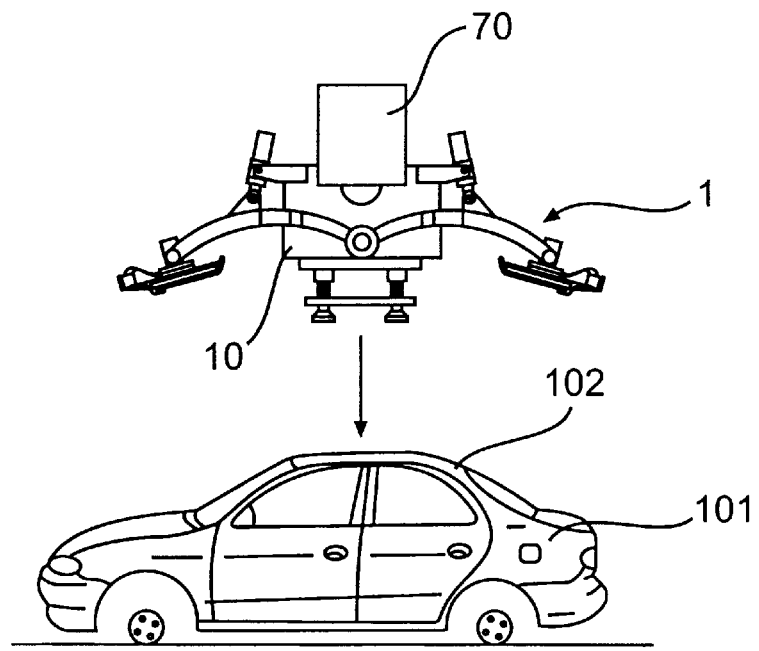
FIG. 4b shows the state where the apparatus in accordance with the present invention is moved above the roof panel of the disused automobile on the working area.
Figure 4C:
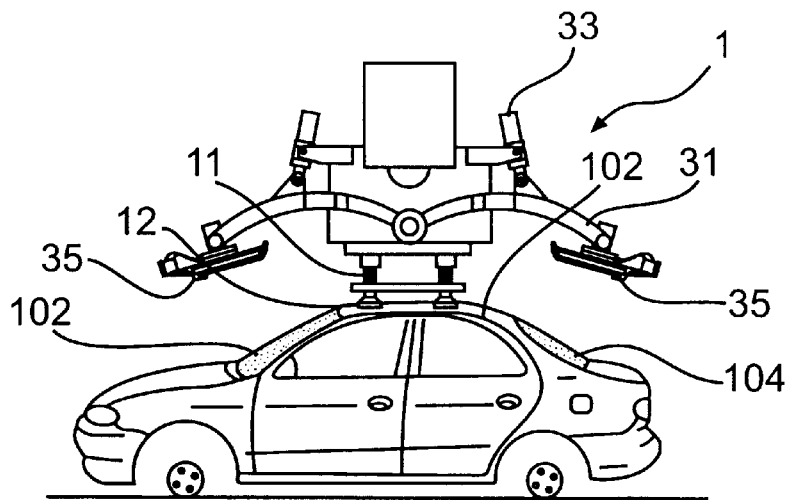
FIG. 4c shows the state where the apparatus in accordance with the present invention is attached on the roof panel of the disused automobile and two glass removers approached the windshield glass and rear window glass of the automobile.

Firstly, as shown in FIG. 4b and FIG. 4c, the movable means 70 is moved down to the surface of the roof panel 102, and then the position of the glass remover 30 is controlled to the molding of the glass.

Next, as shown in FIG. 4c, the main body 10 is fixed to the surface of the roof panel 102 by the attaching means 11 disposed under the main body 10 with the adsorbing force of the pneumatic pressure.

Figure 4D:
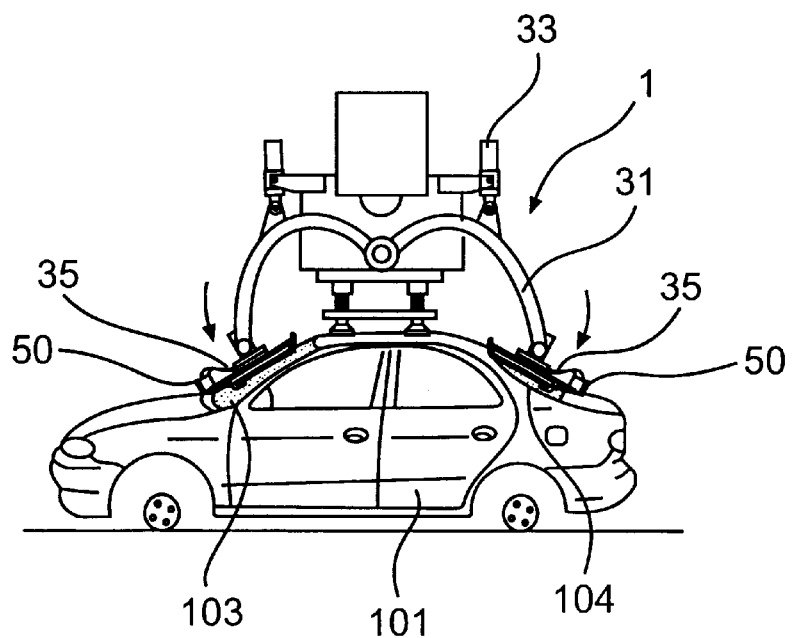
FIG. 4d shows the state where the glass remover is attached to the glass and the molding is removed.

Then, the cylinder 33 of the glass remover 30 is energized and the arms 31 moved downward as shown in FIG. 4d. At this time, the sucker 35 mounted on the end of the arm 31 and the rail 51 of the molding removal system 50 are positioned on the glass 103, 104 and the molding 105 of the glass 103, 104. The glass 103 and 104 are attached to the arms 31 with the sucking pad 37 of the sucker 35.

Figure 3A:
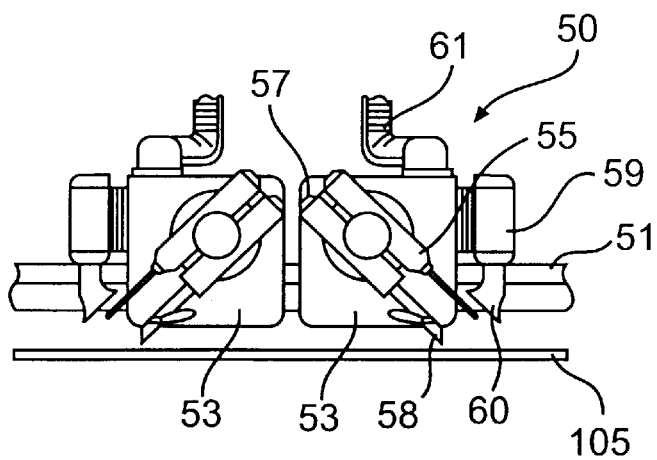
FIG. 3a shows an initial state before the molding is dismounted.
Figure 3B:
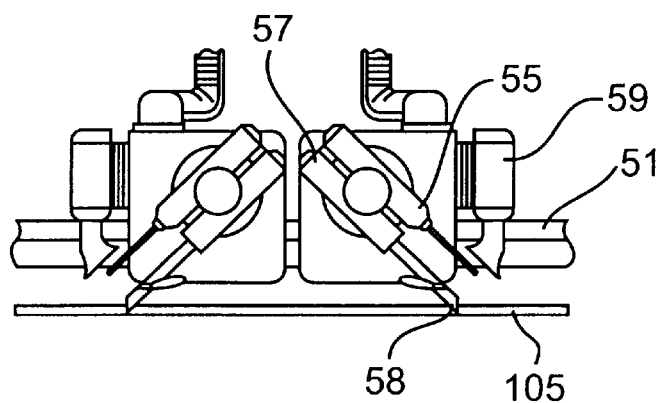
FIG. 3b shows the state where a molding heater and the molding remover are positioned on the molding of the glass of the disused automobile.
Figure 3C:
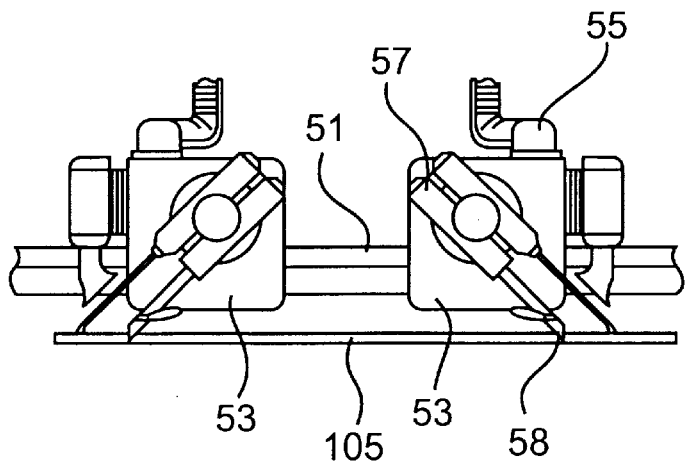
FIG. 3c shows the state where the molding heater is operated and two movable bodies equipped with the molding heater are moved along a rail in opposite directions.

In this state, the operation of the molding removal system 50 is started. As shown in FIG. 3a, the molding heater 55 and the molding remover 57 simultaneously move downward to an operational position. As shown in FIG. 3c, the molding heater 55 is positioned near the molding 105 of the glass 103, 104 and a knife 58 provided on the molding remover 57 is inserted into the molding 105.

Then, the molding heater 55 is operated and the flame from the molding heater 55 heats the molding. Simultaneously, the air ventilator 59 sucks the gas generated from the molding 105 heated by the flame of the heater 55 and purifies the gas.

The two transporters 53 move in opposite directions. The molding remover 57 moves simultaneously with the transporter 53 and the knife 58, provided on the transporter 53, cuts the molding which is softened by the flame of the heater 55.

Figure 4E:
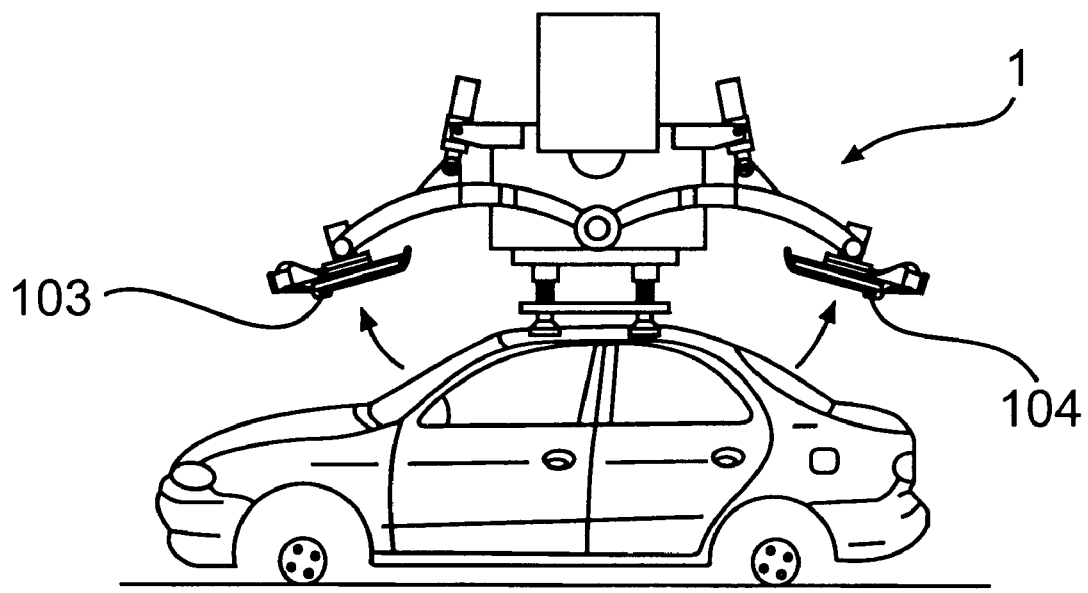
FIG. 4e shows the state where the glass remover is lifted above the automobile with the glass being dismantled from the automobile.

After the molding 105 is removed from glass 103, 104, as shown in FIG. 4e, the arm 31 of the glass-removing device 30 is lifted by contraction of the cylinder 33. At this time, the glass elements 103, 104 attached to the sucker 35 by the vacuum force are simultaneously lifted and removed from the body of the automobile.

Next, the vacuum force of the attaching means 11 is released, and the body 10 is released from the roof of the disused automobile 101. Then, the body 10 with the adhering glass is removed and lifted by the operation of the movable means 70.

The glass 103, 104 removed from the disused automobile 101 is transported to the collecting place and recycled after removing the impurities.

Finally, the disused automobile separated from the glass 103, 104 is transported to the next dismantling steps.

As described above, since the glass-removing device in accordance with the present invention can automatically and simultaneously remove the glass 103, 104, the cost compared to removal by hand is considerably reduced.

Furthermore, the apparatus in accordance with the present invention has the advantages that the glass removed from disused automobile can be recycled, and the pollution of the environment can be reduced.

What is claimed is:

1. An apparatus for dismantling glass from a disused automobile body comprising:

a main body, two glass removers connected with the main body for dismantling front and rear glass from the body of the disused automobile;

two molding removal systems operatively connected with the glass remover for removing molding which connects the glass to the body of the automobile; and a moving means for moving the main body in all directions and controlling the position of the main body relative to the automobile.

2. The apparatus for dismantling the glass from the disused automobile according to claim 1, wherein the glass removers comprise and arm pivotally connected to the main body through a hinge pin; a cylinder connecting the arm with the main body for moving the arm up and down and, a suction device mounted at the end of the arm for attachment to the glass.

3. The apparatus for dismantling the glass from the disused automobile according to claim 1, wherein each of the molding removal systems comprises a rail which is connected with the sucking supporter and arranged to match with the front and rear glass respectively, two transporters moving along the rail molding heaters mounted on the transporters and heating the molding mounted between the glass and the body of the automobile at the edge of the glass, and a molding remover mounted at the rear end of the molding heater for removing the heated molding.

4. The apparatus for dismantling the glass from the disused automobile according to claim 3, further comprising an air ventilator for purifying the gas emanating from the molding while being heated by a flame.

5. The apparatus for dismantling the glass from the disused automobile according to claim 1, wherein the main body has an attaching mechanism that comprises a plurality of pneumatic sucking discs.

* * * * *